United States Patent
Severac

(10) Patent No.: US 12,287,932 B2
(45) Date of Patent: Apr. 29, 2025

(54) METHOD FOR MANUFACTURING A COMBINED TOUCH AND FORCE SENSOR, PARTICULARLY BACKLIT

(71) Applicant: NANOMADE LAB, Toulouse (FR)

(72) Inventor: Fabrice Severac, Toulouse (FR)

(73) Assignee: NANOMADE LAB, Toulouse (FR)

( * ) Notice: Subject to any disclaimer, the term of this patent is extended or adjusted under 35 U.S.C. 154(b) by 0 days.

(21) Appl. No.: 18/784,738

(22) Filed: Jul. 25, 2024

(65) Prior Publication Data

US 2025/0036226 A1 Jan. 30, 2025

(51) Int. Cl.
G06F 3/041 (2006.01)
B82Y 30/00 (2011.01)
G06F 3/044 (2006.01)

(52) U.S. Cl.
CPC .......... G06F 3/0414 (2013.01); G06F 3/044 (2013.01); B82Y 30/00 (2013.01); G06F 2203/04103 (2013.01); G06F 2203/04105 (2013.01)

(58) Field of Classification Search
None
See application file for complete search history.

(56) References Cited

U.S. PATENT DOCUMENTS

| | | | |
|---|---|---|---|
| 11,366,029 B2 | 6/2022 | Severac et al. | |
| 2013/0181726 A1 | 7/2013 | Viallet et al. | |
| 2015/0091859 A1* | 4/2015 | Rosenberg | G06F 3/0446 345/174 |
| 2015/0205481 A1* | 7/2015 | Severac | G06F 3/0488 428/142 |
| 2021/0325993 A1* | 10/2021 | Xu | G06F 3/0416 |
| 2022/0412820 A1* | 12/2022 | Severac | B60K 35/00 |
| 2023/0021208 A1 | 1/2023 | Cazes | |

FOREIGN PATENT DOCUMENTS

| | | |
|---|---|---|
| AU | 2018201027 A1 | 3/2018 |
| EP | 2601491 A1 | 6/2013 |
| EP | 2877911 A1 | 6/2015 |
| EP | 4111151 A1 | 1/2023 |
| WO | 2020116500 A1 | 6/2020 |
| WO | 2021170883 A1 | 9/2021 |
| WO | 2023111344 A1 | 6/2023 |

* cited by examiner

*Primary Examiner* — Stephen T. Reed

(57) ABSTRACT

The invention is about a sensor assembly comprising, on an active part (621, 622), an assembly of conductive nanoparticles (560) in an insulating ligand, a substrate on which conductive tracks (611, 612, 613, 650, 651) and the assembly of nanoparticles are deposited, a thin stiffener (630) extending under the active part, glued to the substrate by a hardening glue on a first face of the thin stiffener and a pressure-sensitive adhesive attached to a second face of the thin stiffener (630), opposite the first face, configured for bonding the miniature sensor to a surface to be functionalized. The invention also relates to a method for manufacturing of such a sensor assembly.

12 Claims, 7 Drawing Sheets

METHOD FOR MANUFACTURING A COMBINED TOUCH AND FORCE SENSOR, PARTICULARLY BACKLIT

CROSS-REFERENCE TO RELATED APPLICATIONS

This application claims priority of French Provisional Application FR2308095 filed on Jul. 26, 2023 and of French Application FR2403400 filed on Apr. 2, 2024, which are hereby introduced by reference in their entirety.

BACKGROUND OF THE INVENTION

The invention belongs to the field of sensors in particular those adapted to detecting a touch and delivering information proportional to the force applied during this touch.

Such a sensor may be backlit and may be used, for instance, in lieu of a control button, more particularly, for consumer applications in the fields of computer terminals, control buttons in vehicle interiors, on household appliances without this list being limiting.

These sensors make it possible to integrate proportional tactile controls on any type of surface, rigid or flexible by a simple bonding, and thus advantageously replace controls traditionally made with push buttons or mechanical selectors, offering in particular the advantages of a low thickness, adjustable sensitivity, a much simpler integration, the absence of moving parts and the absence of mechanical closure/opening of a contact.

Such a sensor may implement a nanoparticles assembly as described in document EP 2 601 491A1.

The sensors described the latter document have a very high sensitivity and, by their operation, may be attached on the surface of any substrate, rigid or flexible, in order to functionalize this surface.

As a non-limiting example, such a sensor may be glued on an automotive accessory, such as an armrest, a dashboard or console, either directly on the surface exposed to touch or on the backside of the latter. A pressure exerted on the area where the sensor is located enables to control an action, such as the descent or lifting of an electric window, the operation of windshield wipers etc. . . . thus avoiding the installation of any mechanical switch.

In addition, such sensors exhibiting a variable response depending on an applied force applied, such an information may be directly used to control the targeted device, for example, a higher pressure leads to a higher windshield wiper scanning speed.

Examples of applications of such sensors in the automotive field are given in document EP 4 111 151A1.

According to embodiments, the sensors adapted to this type of application are of the combined touch and force type as described in document WO 2021 170883 and comprise a proximity sensor comprising conductive tracks configured to produce a capacitive sensor and a force sensor comprising an assembly of conductive or semiconductive nanoparticles, in colloidal suspension in an electrically insulating ligand, the nanoparticles assemblies being deposited between electrodes, advantageously interdigitated as described in document WO 2023 111344 and leaving an open or transparent central area to allow in particular the appearance of a backlit pictogram.

These sensors of the prior art, although effective. are nevertheless poorly adapted to mass production implementation because of at least two reasons:

the connection of said sensors on the surfaces to be functionalized, performed with a liquid hardening glue; and the manufacturing of the sensor or of a set of sensors according to prior art is fully carried out by microprinting.

Indeed, the surface functionalization techniques as described in document EP 2 877 911A1, although effective for the applications referred to in this document, are not very suitable for the installation of numerous sensors scattered on various flexible and rigid surfaces in a congested and poorly accessible environment, for example in an automobile interior and where the elements can be manufactured from various sources. Moreover, the disclosed method is not conventional and requires the development of expensive installations for implementation in very large series.

Even if the sensor is deposited on a first substrate, for example flexible, and this assembly is then set on a rigid or flexible surface to be functionalized, the assembly comprising the first substrate and the sensor is to be glued on the surface to be functionalized, for example, by means of a polymerizable liquid hardening glue of the cyanoacrylate or epoxy type in order to provide a firm support and a good mechanical coupling between the assembly of the first substrate and the sensor with the surface thus functionalized.

However, the application of such liquid adhesives, which is to be applied accurately on a reduced surface area, is not suitable for a large-scale manufacturing process, such as in the automotive industry, where the use of pressure-sensitive adhesives (PSAs) films is preferred.

But the use of a pressure-sensitive adhesive film to achieve such a bonding reduces, on the one hand, the sensor ability to detect an applied force, which translates in an apparent decrease in the sensor sensitivity, and on the other hand, leads to relaxation phenomena affecting the response of the sensor.

SUMMARY OF THE INVENTION

The shortcomings of the prior art are solved by a sensor assembly comprising:

a miniature sensor comprising, on an active area, an assembly of conductive nanoparticles in an insulating ligand;

a substrate on which conductive tracks and the assembly of nanoparticles are deposited;

a thin stiffener glued to the substrate by a hardening glue on a first face of the thin stiffener and extending underneath the active part; and a pressure-sensitive adhesive attached to a second face of the thin stiffener, opposite the first face, configured for bonding the miniature sensor to a surface to be functionalized.

Thus, the thin stiffener makes it possible to attach the sensor assembly to a surface to be functionalized, whether it is flexible or rigid, by means of a pressure sensitive adhesive without the drawback of the relaxation phenomena.

The sensitivity to low deformations of the active part achieved by the technology based on nanoparticles, makes it possible to maintain a high enough sensitivity despite the presence of the thin stiffener.

The sensor assembly may be implemented according to some embodiments and variants exposed hereafter, which are to be considered individually or according to any technically operative combination.

According to some exemplary embodiment, the thin stiffener is made of a polycarbonate with a thickness comprised between 0.05 mm and 0.2 mm.

According to some embodiment, the substrate is transparent and chosen among: a polyethylene terephthalate, a (co-)polymer cycloolefinic and a polyimide.

Conductive tracks may comprise metal tracks chosen from: copper, gold, nickel and a cupronickel alloy.

The conductive tracks may comprise transparent tracks made form a material chosen among: an indium-doped tin oxide and an electrically conductive transparent polymer.

According to some embodiment, the sensor assembly may comprise a central transparent area, the active area comprising the assembly of nanoparticles being located on an edge of the central transparent area. This embodiment makes it possible to position a backlit pictogram in the central transparent area.

A combined proximity and force sensor assembly, may be manufactured by a method comprising steps of:
- obtaining a laminate comprising a conductive metal layer on a polymer substrate;
- making tracks in the conductive metal layer by photo-etching;
- depositing at least one assembly of conductive nanoparticles in an insulating ligand on an active area between and on two tracks by microprinting, so as to create a force sensor;
- bonding to the polymer substrate a thin stiffener extending underneath the active area, with a stiff glue; and
- attaching a film of pressure sensitive adhesive to the thin stiffener.

This method makes it possible to use a laminate and printed circuit board photoetching techniques for making the combined sensor assembly in large series with precision making of the conductive tracks compared to microprinting on a substrate.

According to some embodiment, the conductive metal layer is made of a metal chosen from: copper, gold, nickel and a cupronickel alloy, the polymer substrate being transparent, the conductive metal layer is removed by photoetching in a central area so that the combined proximity and force sensor assembly comprises a transparent central area.

According to a first variant of this embodiment, the laminate comprises a transparent conductive layer and the method comprises a step of removing the conductive metal layer in a central transparent area and a step of photoetching the transparent conductive layer in the central transparent area to create at least one transparent conductive area configured as a capacitive sensor.

According to another variant the method may comprise a step of microprinting of at least one central conductive area in the transparent central area with a transparent conductive polymer, to create a capacitive sensor.

The step of microprinting of the conductive tracks in the transparent central area may be carried out by inkjet.

Alternatively, the step of micro-printing the conductive tracks in the transparent area may be carried out by screen printing.

BRIEF DESCRIPTION OF DRAWINGS

The sensor assembly and its exemplary method of manufacture may be implemented according to the nonlimiting embodiments exposed hereafter with reference to FIG. 1 to FIG. 9 in which.

DETAILED DESCRIPTION OF THE INVENTION

Figure 1:
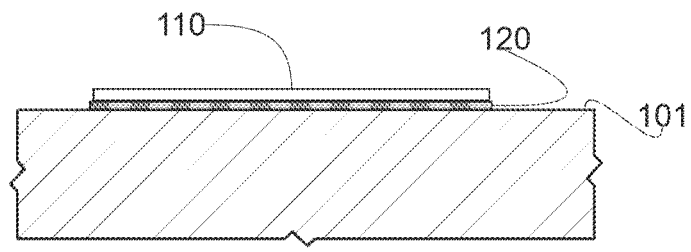
FIG. 1 relating to prior art depicts according to a cross-sectional view the installation of a miniature sensor on a surface to be functionalized.

FIG. 1 relating to prior art illustrates a bonding of a miniature sensor (110) on a surface (101) to be functionalized. The miniature sensor (110) is bound to the surface to be functionalized by a layer of hardening polymerizable glue (120) of the cyanoacrylate or of the epoxy type, applied in a liquid state.

However, the application of such a liquid adhesive, to be applied on a small area and with precision, is not well suited to a manufacturing process in mass production such as in the automotive industry and requires keeping the miniature sensor (110) in contact with the surface to be functionalized (101) for the polymerization time of the adhesive. It is also difficult to implement such a process by a robot. This is the reason why pressure sensitive adhesives (PSA) in film form are preferred for this kind of implementation.

Figure 2:
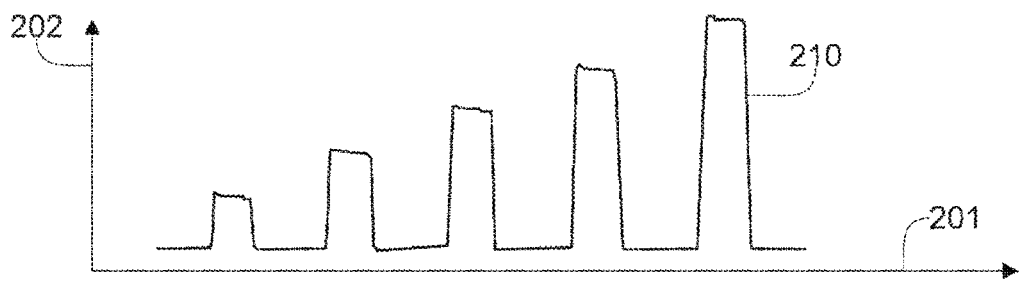
FIG. 2 relating to prior art shows the comparative temporal responses of the miniature sensor of FIG. 1 subjected to load steps in the case of a bonding with a rigid adhesive and in the case of a bonding with a pressure-sensitive adhesive film.
Figure 2:
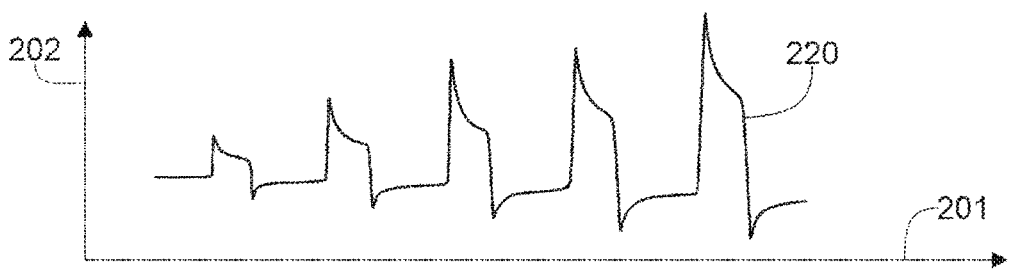

FIG. 2, however, if the adhesive layer (120) of FIG. 1 is replaced by a pressure-sensitive adhesive film, on the one hand, the ability of the miniature sensor to detect a force is reduced, resulting in an apparent decrease in the sensitivity, and on the other hand, relaxation phenomena occur and change the response of the miniature sensor.

Thus, FIG. 2 shows in a time (201)—output value (202) diagram, an example of the temporal response (210) to loading steps of a miniature sensor bonded with a hardening glue, as shown FIG. 1, and an example of a temporal response (220) of the same miniature sensor but where the hardening glue layer (120 FIG. 1), has been replaced by a pressure-sensitive adhesive film, in both cases at similar loading levels.

A hardening glue is a glue that once applied in a liquid state, cures and hardens by a polymerization process creating strong polymer chains that bond materials tightly.

A pressure-sensitive adhesive is a tacky adhesive that adhere to surfaces upon applying a pressure. When the pressure is applied, the adhesive flows to cover the surface area it is in contact with, causing sufficient tack. A pressure-sensitive adhesive does not cure or crosslink after application and remains in a viscoelastic state.

The output curves (210, 220) are independent of the nature of the object bearing the surface to be functionalized (101), whether it is flexible (textile) or rigid (metal, wood), whether the miniature sensor (110) is directly exposed to touch or whether it is installed on a backside of the touch surface.

Figure 3:
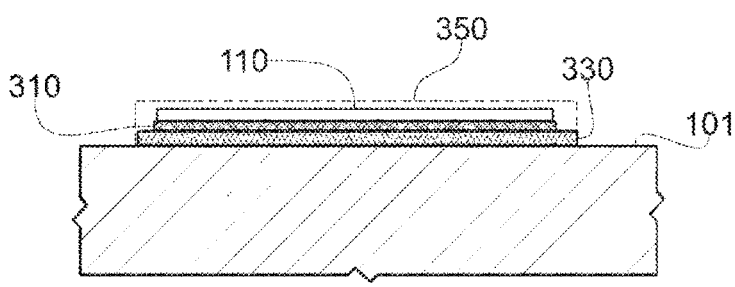
FIG. 3 shows, according to a cross-sectional view, a sensor assembly bound to a surface to be functionalized by a pressure-sensitive adhesive film.

FIG. 3 according to some exemplary embodiment, a sensor assembly (350) comprises a miniature sensor (110), glued at the time of its manufacture on a thin stiffener (310) for example consisting of a polycarbonate with a thickness comprised between 0.05 mm and 0.2 mm, by a hardening glue (not represented), for example of the epoxy or of the cyanoacrylate type.

The sensor assembly (350) further comprises a pressure-sensitive adhesive film (330) attached to the underside of the thin stiffener enabling to stick the sensor assembly (350) to the surface to be functionalized (101).

Figure 4:
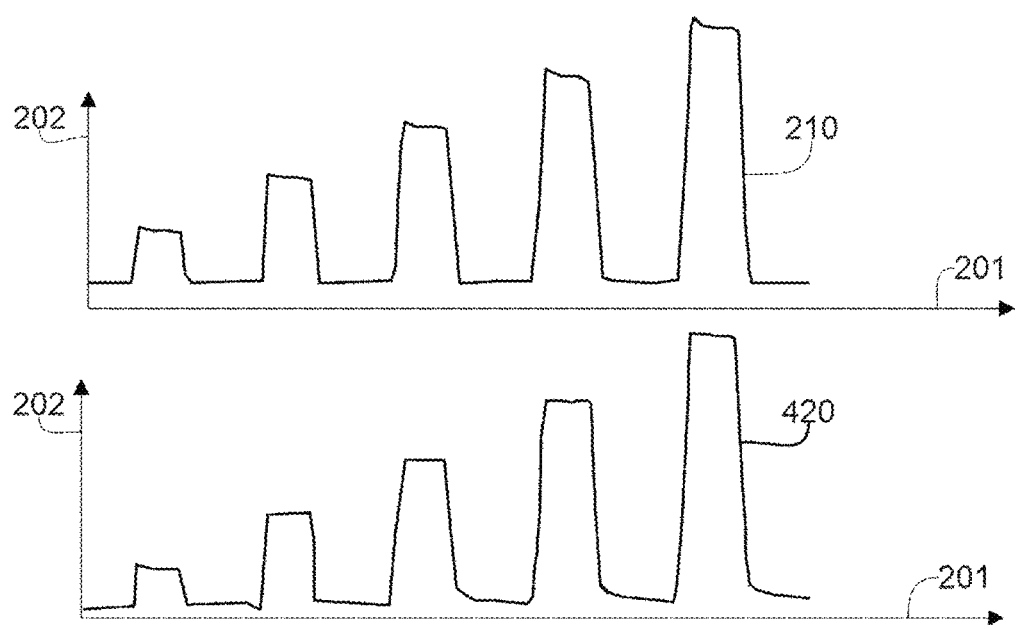
FIG. 4 shows the comparative temporal responses of the sensor assembly as shown in FIG. 3 subjected to load steps in the case of a bonding with a rigid adhesive and in the case of a bonding with a pressure-sensitive adhesive film.

FIG. 4 compares the temporal response (210) of the miniature sensor (110) installed according to the assembly shown FIG. 1 and stuck with a hardening glue on the surface to be functionalized (101), and the temporal response (420) of the sensor assembly (350) attached on the same surface to be functionalized (101) through the pressure-sensitive adhesive film (330), in both cases subjected a same succession of load steps.

The thin stiffener (310) drastically reduces relaxation phenomena in the temporal response (420) of the sensor assembly (350) attached to the surface to be functionalized by the pressure-sensitive adhesive film (330).

The output curve (420) is independent of the nature of the object bearing the surface to be functionalized (101), whether it is flexible (textile) or rigid (metal, wood), whether the sensor assembly (350) is directly exposed to the touch, or whether it is installed on a backside of the touch surface.

Figure 5:
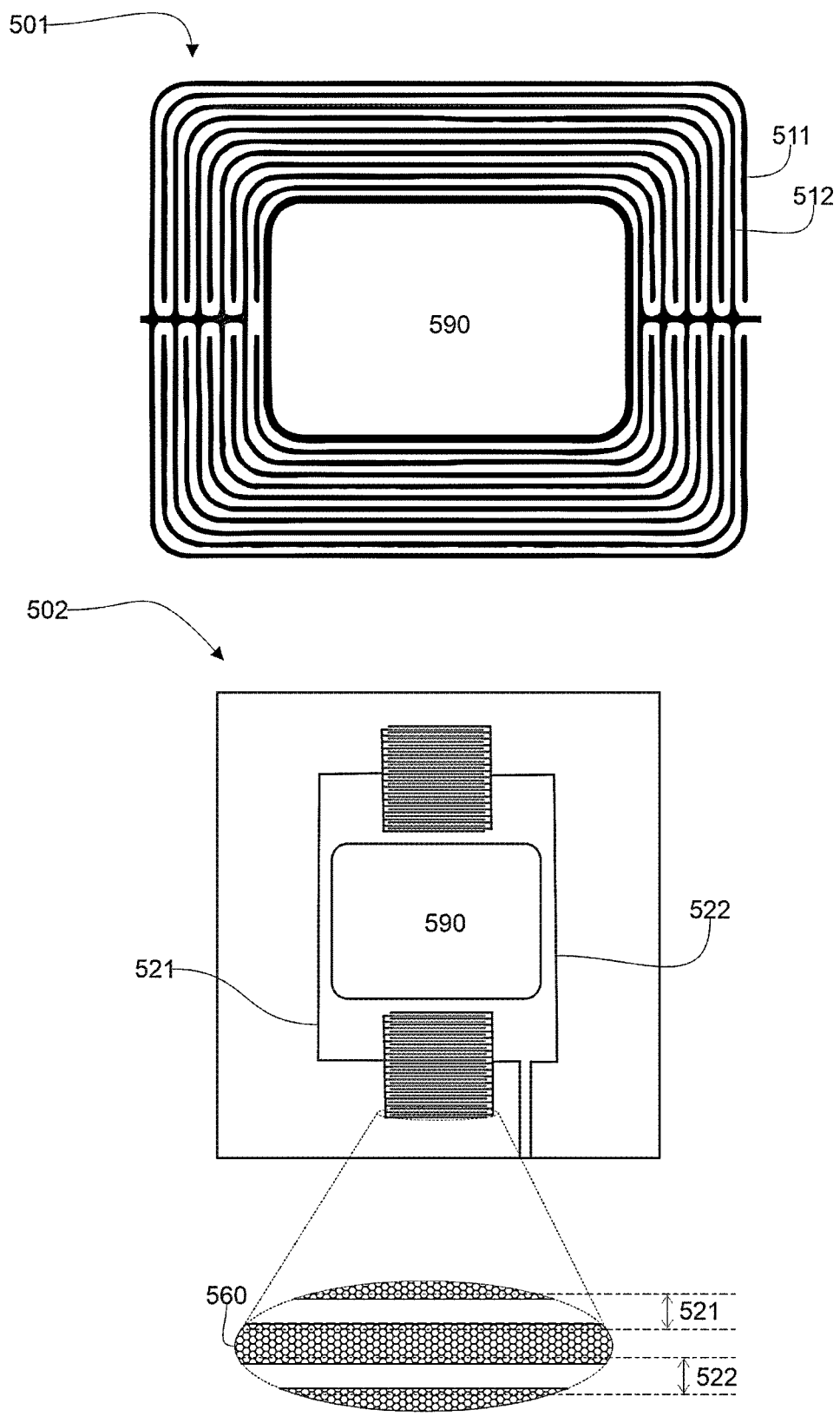
FIG. 5 illustrates schematically in a top view and in a detail view, two examples of making the active area (force transducer) of a sensor assembly comprising a transparent central area.

FIG. 5 according to some embodiment, the miniature sensor (501. 502) on top of the sensor assembly comprises a transparent central area (590).

In particular, this configuration makes it possible to show a backlit pictogram in the transparent central area (590) when the sensor assembly is attached to a surface to be functionalized comprising such a pictogram.

In these two exemplary embodiments, the miniature sensor (501, 502) on top of the sensor assembly comprises a force sensor extending around and outside the transparent central area (590), and comprises two conductive tracks (511, 512, 521, 522), for example made of copper, that are at least locally interdigitated.

According to some embodiment, the two conductive tracks (511, 512) of the miniature sensor (501) on top of the sensor assembly, are interdigitated all around the transparent central area (590), according to another embodiment the two conductive tracks (521, 522) of the miniature sensor (502) on top of the sensor assembly, are interdigitated in two zones on either side of the transparent central area (590).

Thus, the active area making the force sensor is at least one area extending under the interdigitation areas of the conductive tracks (511, 512, 521, 522).

These embodiments are just examples where the transparent central area (590) is substantially rectangular. Those skilled in the art will understand that this area take any other shape and that the number of interdigitation zones of the electrodes around this transparent central area may be any, depending on the intended application.

To make the force sensor, assemblies of conductive nanoparticles in an insulating ligand (560) are deposited between the conductive tracks (521, 522) in the areas where they are interdigitated, so that an assembly of nanoparticles (560) extends between the two interdigitated tracks (521, 522) and is in electrical contact with each of them.

As non-limiting examples, the nanoparticles of the assembly may be gold, copper, carbon or indium-doped tin oxide (ITO) nanoparticles. For example, the ligand is based on phosphonic acid.

The assemblies of nanoparticles (560) are, for example, deposited by microprinting techniques like inkjet or screen printing.

The miniature sensor (501, 502) is set on top of a sensor assembly, bonded by a hardening glue to a thin stiffener extending under the active areas where the conductive tracks are interdigitated, a pressure-sensitive adhesive film is bonded by means of a hardening glue to the underside of the thin stiffener enabling the sensor assembly to be attached on a surface to be functionalized by means of the pressure-sensitive adhesive film, either directly on this surface, the sensor assembly being exposed to touch, or on a backside of the touch surface.

According to exemplary embodiments, the thin stiffener may or may not cover the transparent central area, when the thin stiffener extends over the transparent central area, it is also made of a transparent material.

Figure 6:
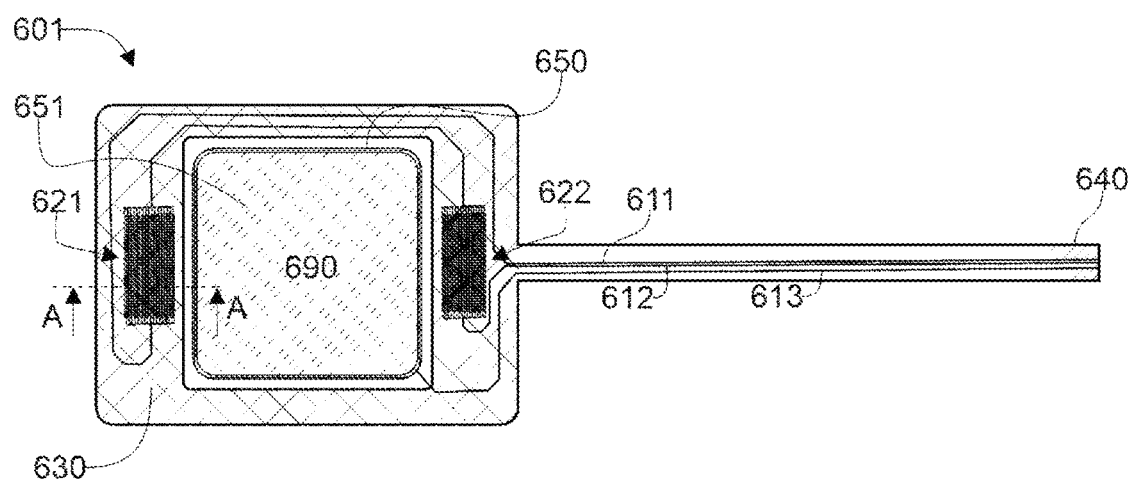
FIG. 6 shows schematically in a top view an example of a sensor assembly comprising a force sensor and a proximity sensor located in its central transparent area.

FIG. 6 according to some other exemplary embodiment, the miniature sensor (601) on top of the sensor assembly comprises a transparent central area (690) and at least two conductive tracks (611, 612) comprising active areas (621, 622) where the two conductive tracks (611, 612) are interdigitated, assemblies of nanoparticles are deposited between the conductive tracks to create a force sensor.

Additionally, the miniature sensor may comprise at least one conductive track (650, 651) that extends into the transparent central area (690) and configured to create a capacitive sensor capable of detecting a proximity of an object hovering at short distance over the sensor.

The detection of such a proximity enables to detect a potential touch a moment before the object actually touches the functionalized surface, the actual touch being further confirmed by the touch sensor.

This early detection of a touch event, before the touch actually occurs, enables to reset a zero value of the force sensor, the output value of which may drift with time.

Thus, according to an exemplary embodiment, the transparent central area (690) comprises a connection track (650) at a periphery of the transparent central area. The connection track is for example made of copper by photoetching, and a conductive track (651) is made by microprinting with a transparent conductive ink, for example of the PEDOT type, covering most of the transparent central area (690) as well as the connection track (650).

The advantage of this combination of a proximity sensor and a force sensor are further explained in particular in document WO 2021 170883.

The conductive track (651) in the transparent central area may be connected via the connection track (650) and via at least one other conductive track (613), to an electrical connection end (640) of the sensor assembly.

To make the sensor assembly, a thin stiffener is glued to the miniature sensor, for example under the hatched area (630) of [FIG. 6], and a pressure-sensitive adhesive film is glued underneath the thin stiffener.

Figure 7:
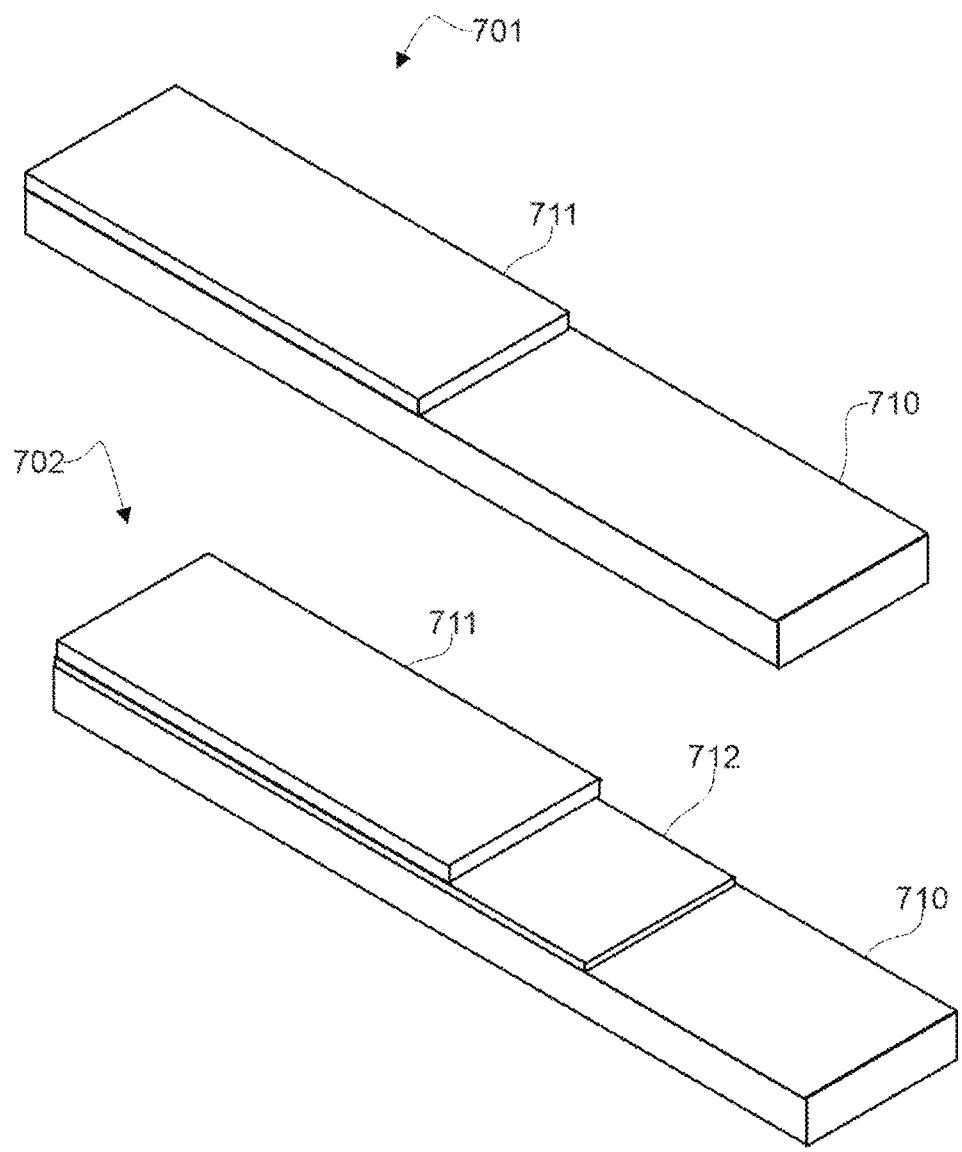
FIG. 7 represents, from a cut-out perspective, two examples of making a laminate suitable for making conductive tracks by photoetching.

FIG. 7 one or more miniature sensors intended to be placed on top of a sensor assembly, each comprising a transparent central area comprising a transparent proximity sensor and a force sensor on the edge of the transparent central area, may be made economically in large series by techniques used for the making of printed circuits, starting from a laminate (701, 702) comprising a conductive metal layer (711) on a transparent polymer substrate (710).

By way of non-limiting examples, the polymer substrate (710) consists of a polyethylene terephthalate (PET), a cycloolefinic (co-)polymer (COP, COC) or a polyimide with a thickness comprised between 100 µm and 300 µm.

The conductive metal layer (711) is for example made of copper, gold, nickel or an alloy of these elements, like a cupronickel alloy, with a thickness comprised between 150 nm and 15 µm (1 nm=$10^{-9}$ m, 1 µm=$10^{-6}$ m).

According to some exemplary embodiment, the laminate (702) may comprise, between the transparent polymer substrate (710) and the conductive metal layer (711), underneath the conductive metal layer, an intermediate transparent conductive layer (712), made, for example, of an indium-doped tin oxide (ITO). The thickness of this intermediate transparent conductive layer (712) may also be comprised between 150 nm and 15 µm.

The use of such a laminate (701, 702) makes it possible to make all the conductive tracks in an economical manner by photoetching, as for the mass production of printed circuits.

Returning to FIG. 6, according to an exemplary embodiment all of the non-transparent conductive tracks (611, 612, 613, 650) may be photoetched into the conductive metal layer of a laminate shown in FIG. 7, the transparent conductive area (651) may be etched into the transparent conductive layer (712 FIG. 7) if the laminate comprises such a layer, and the conductive layers are removed by photoetching outside the conductive tracks (611, 612, 613, 650).

A plurality of such miniature sensors (601) may be photoetched at the same time on a single laminated plate.

The accuracy of photoetching may reach 10 µm for a precision engraving, while still remaining compatible with mass production.

The laminate (701, 702) may comprise coating of a conductive metal layer (711) and, according to the embodiment, of a transparent conductive layer (712) on its two faces, which makes it possible, for example, to produce a proximity sensor on one face and a force sensor on the other face, or to produce force sensors on each face so as to achieve thermal compensation as explained in document U.S. Pat. No. 11,366,029 B2.

The nanoparticles assemblies are deposited between and on the conductive tracks, in the active areas, by microprinting implementing inkjet or screen printing.

Screen printing also makes it possible to make every nanoparticle deposit at once on a photoetched laminated plate comprising a plurality of miniature sensors, with a positioning accuracy in the order of +50 µm.

According to another exemplary embodiment, starting from a laminate (701) not comprising a transparent conductive layer (712), the transparent conductive area (651) is also produced by a microprinting technique, for example with a transparent conductive polymer of the PEDOT (poly(3,4-ethylenedioxythiophene) type.

Microprinting may be carried out by inkjet or screen printing.

The surface of the laminated plate receiving microprinting may be previously treated with a plasma treatment so as to clean and activate it in a pre-microprint stage.

A protective film, for example made of polyimide or PET, with a thickness comprised between 25 µm and 50 µm, may be deposited on each miniature sensor made on the laminated plate, by a screen-printing method, in one or more layers.

According to some exemplary embodiment, to make the sensor assembly, the laminate plate comprising the miniature sensors is attached and glued to the face of a plate capable of making a thin stiffener, and then a film of pressure-sensitive adhesive comprising, for example, a peelable protection is attached underneath the thin stiffener.

Individual miniature sensors may then be cut out from the plate.

Figure 8:
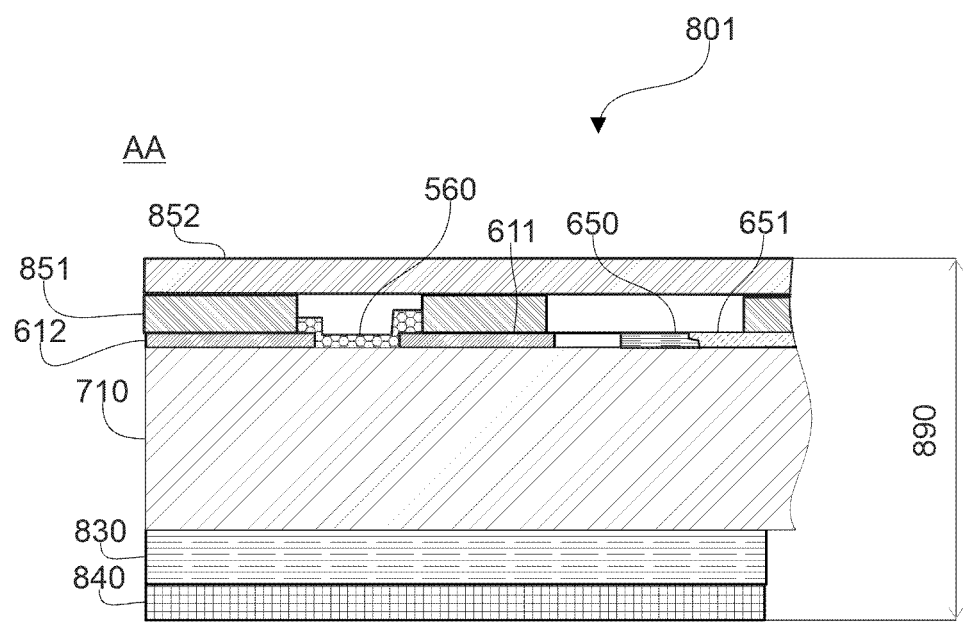
FIG. 8 shows, according to a simplified view in partial section AA defined FIG. 6, an exemplary embodiment of a sensor assembly.

FIG. 8, thus each sensor assembly (801) is in the form of a sandwich comprising a transparent polymer substrate (710), the latter is rigidly bonded by one of its faces to a thin stiffener (830) at the active area locations, a thin stiffener to which a pressure-sensitive adhesive film (840) is attached to enable the sensor assembly to be bonded to a surface to be functionalized.

On its opposite side, the transparent polymer substrate (710) comprises conductive tracks (611, 612, 650) obtained by photoetching. On and between some of these conductive tracks, in active areas, assemblies of nanoparticles (560) are deposited by a microprinting technique.

A transparent conductive area (651) is produced in a transparent central area by photoetching or by a microprinting technique.

A first protective layer (851) is deposited, for example, by screen printing, a second protective layer (852) is deposited on the first.

The total thickness (890) of the sensor assembly thus produced is comprised 0.15 mm and 0.3 mm.

Figure 9:
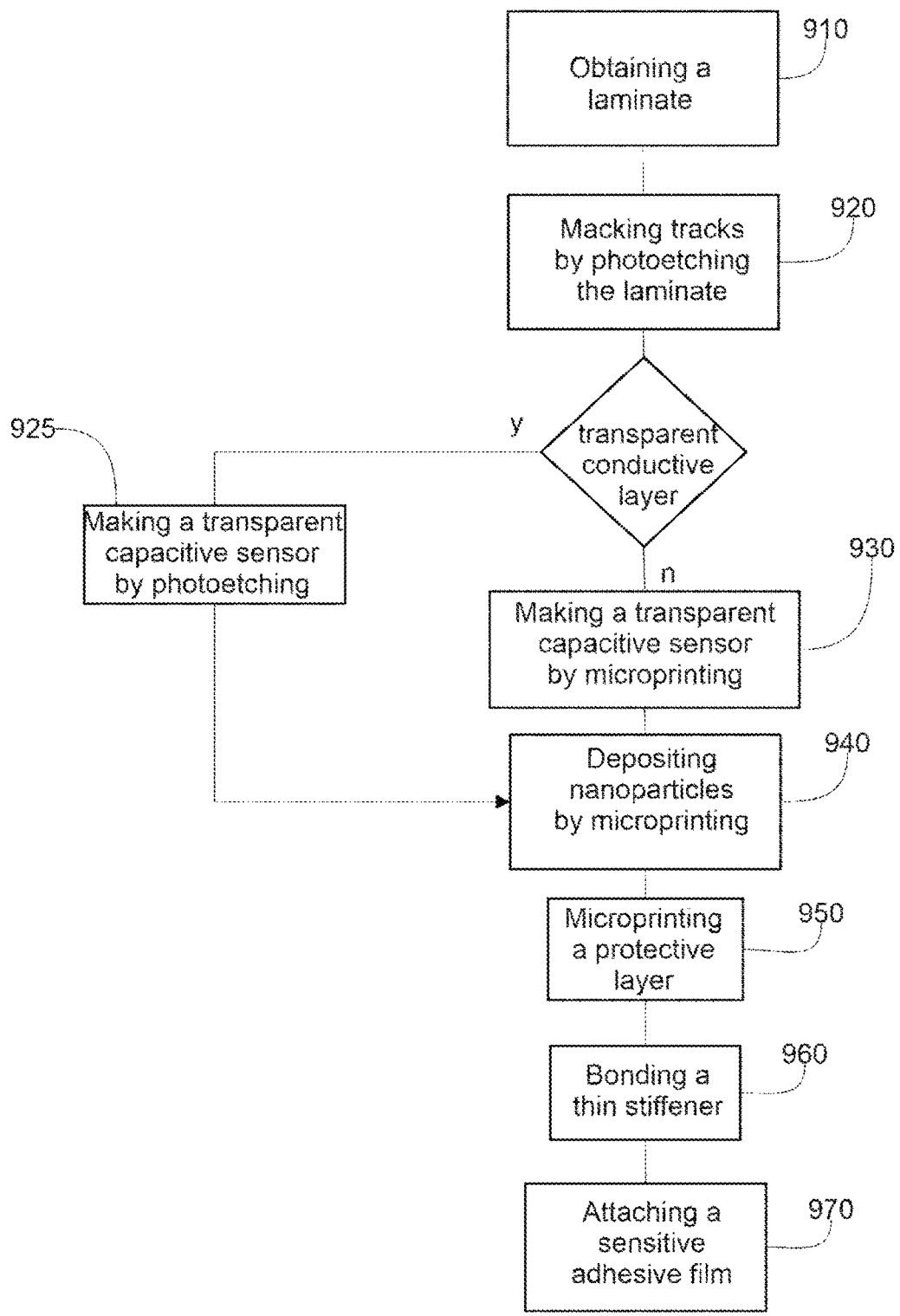
FIG. 9 is a flow chart of an exemplary embodiment of the method.

FIG. 9 the manufacturing method starts with a laminate to be obtained (910) in the first place The laminate comprises a transparent polymer substrate and a conductive metal layer on top of the substrate. The laminate may or not comprise an intermediate transparent conductive layer.

In a track making step (920) conductive tracks are engraved by photoetching in the top conductive layer of the laminate, to make active areas, living a transparent central area where the top conductive layer is completely removed.

If the laminate comprises an intermediate transparent conductive layer a, I a first alternative step (925) a capacitive sensor is made in the central transparent area by photoetching the transparent conductive layer (925) of the laminate.

If the laminate does not comprise an intermediate transparent conductive layer, in a second alternative step (930), a capacitive sensor may be made in the transparent central area by depositing by microprinting a transparent conductive polymer such as PEDOT.

In a nanoparticles deposition step (940) assemblies of conductive nanoparticles in an insulating ligand are deposited between and on the conductive tracks in the active area.

In a protecting step (950) one or more protective layer are deposited by microprinting to top of the assembly.

In a stiffening step (960) a thin stiffener is bound to an underneath face of the substrate by a hardening glue.

Finally, the method comprises a step of attaching (970) a pressure sensitive film underneath the thin stiffener.

The invention claimed is:
1. A sensor assembly comprising:
a miniature sensor comprising, on an active area, an assembly of conductive nanoparticles in an insulating ligand;

a substrate on which conductive tracks and the assembly of nanoparticles are deposited;

a thin stiffener glued to the substrate by a hardening glue on a first face of the thin stiffener and extending underneath the active area; and a pressure-sensitive adhesive attached to a second face of the thin stiffener, opposite the first face, configured for bonding the miniature sensor to a surface to be functionalized.

2. The sensor assembly of claim 1, wherein the thin stiffener is made of a polycarbonate with a thickness comprised between 0.05 mm and 0.2 mm.

3. The sensor assembly of claim 1, wherein the substrate is transparent and selected from: polyethylene terephthalate, cycloolefinic (co-)polymer, and polyimide.

4. The sensor assembly of claim 1, wherein the conductive tracks comprise metallic tracks selected from: copper, gold, nickel, and a cupronickel alloy.

5. The sensor assembly of claim 1, wherein the conductive tracks comprise a transparent conductive area made of a material selected among: an indium-doped tin oxide and an electrically conductive transparent polymer.

6. The sensor assembly of claim 1, comprising a central transparent area, the active area comprising the assembly of nanoparticles being located on an edge of the central transparent area.

7. A method for manufacturing a combined proximity and force sensor assembly comprising steps of:

obtaining a laminate comprising a conductive metal layer on a polymer substrate;

making tracks in the conductive metal layer by photoetching;

depositing at least one assembly of conductive nanoparticles in an insulating ligand on an active area between and on two tracks by microprinting, so as to create a force sensor;

bonding to the polymer substrate a thin stiffener extending underneath the active area, with a hardening glue; and attaching a film of pressure sensitive adhesive to the thin stiffener.

8. The method of claim 7, wherein the conductive metal layer is made of a metal chosen from: copper, gold, nickel and a cupronickel alloy, the polymer substrate being transparent, the conductive metal layer is removed by photoetching in a central transparent area so that the combined proximity and force sensor assembly comprises a transparent central area.

9. The method of claim 8, wherein the laminate comprises a transparent conductive thin film underneath the conductive metal layer and the method comprises a step of photoetching the transparent conductive thin film in the central transparent area to create at least one transparent conductive area configured as a capacitive sensor.

10. The method of claim 8, comprising a step of microprinting of at least one transparent conductive area in the transparent central area with a transparent conductive polymer, to create a capacitive sensor.

11. The method of claim 10, wherein microprinting in the transparent central area is carried out by inkjet.

12. The method of claim 10, wherein the microprinting in the transparent central area is carried out by screen printing.

* * * * *